US012649133B2

(12) United States Patent
Guo et al.

(10) Patent No.: US 12,649,133 B2
(45) Date of Patent: Jun. 9, 2026

(54) METHODS AND SYSTEMS FOR DYNAMIC CONTROL OF AN ACOUSTIC FIELD

(71) Applicant: The Trustees of Indiana University, Bloomington, IL (US)

(72) Inventors: Feng Guo, Bloomington, IN (US); Hongwei Cai, Bloomington, IN (US)

(73) Assignee: The Trustees of Indiana University, Bloomington, IN (US)

( * ) Notice: Subject to any disclaimer, the term of this patent is extended or adjusted under 35 U.S.C. 154(b) by 398 days.

(21) Appl. No.: 18/273,326

(22) PCT Filed: Jan. 27, 2022

(86) PCT No.: PCT/US2022/014128
§ 371 (c)(1),
(2) Date: Jul. 20, 2023

(87) PCT Pub. No.: WO2022/165058
PCT Pub. Date: Aug. 4, 2022

(65) Prior Publication Data
US 2024/0082798 A1 Mar. 14, 2024

Related U.S. Application Data

(60) Provisional application No. 63/143,101, filed on Jan. 29, 2021.

(51) Int. Cl.
B01F 35/43 (2022.01)
B01F 35/212 (2022.01)
(Continued)

(52) U.S. Cl.
CPC ........ B01F 35/3201 (2022.01); B01F 35/212 (2022.01); B01F 35/2204 (2022.01);
(Continued)

(58) Field of Classification Search
CPC ............... B01F 35/3201; B01F 35/212; B01F 35/2204; B01F 35/2215; B01F 35/43;
(Continued)

(56) References Cited

U.S. PATENT DOCUMENTS 3,957,650 A * 5/1976 Petrushkin ................ B04B 3/06
210/380.1
5,562,823 A * 10/1996 Reeves ................. B04B 5/0421
210/243
(Continued)

OTHER PUBLICATIONS

International Preliminary Report on Patentability received for PCT Patent Application No. PCT/US2022/014128, mailed on Aug. 10, 2023, 10 pages.
(Continued)

*Primary Examiner* — Joseph W Drodge
(74) *Attorney, Agent, or Firm* — Faegre Drinker Biddle & Reath LLP

(57) ABSTRACT

Disclosed are methods and systems for implementing dynamic control of acoustic fields, which involves the use of machine learning through a Markov Decision Process. The machine learning algorithm monitors an attribute of a system and maintains the attribute within a range by altering a signal sent to an acoustic transducer. The acoustic transducer is configured to alter the attribute of the system. The attribute may be an attribute of the acoustic field produced by the acoustic transducer, or may be an attribute of another element of the system, such as a fluid, a rotor, or a cell mass.

23 Claims, 8 Drawing Sheets

(51) Int. Cl.

| | |
|---|---|
| *B01F 35/22* | (2022.01) |
| *B01F 35/221* | (2022.01) |
| *B01F 35/32* | (2022.01) |
| *B06B 3/00* | (2006.01) |
| *G06N 5/00* | (2023.01) |
| *G10K 15/00* | (2006.01) |

(52) U.S. Cl.
CPC .......... *B01F 35/2215* (2022.01); *B01F 35/43* (2022.01); *B06B 3/00* (2013.01); *G06N 5/00* (2013.01); *G10K 15/00* (2013.01)

(58) Field of Classification Search
CPC ........ B01F 33/503; B01F 35/20; B01F 35/21; B01F 35/22; B01F 35/2201; B01F 35/2208; B01F 35/2209; G01H 3/00; G01H 3/04; G01H 3/06; G01H 3/10; G01H 3/12; G01H 11/00; G01H 17/00; G10K 15/00; B06B 3/04; B06B 3/00; C02F 1/36; C02F 1/38; B01D 21/26; B01D 21/262; B01D 21/30; B01D 21/302; B01D 33/804; B01D 35/20; B01D 35/21; B01D 35/22; B01D 35/2201; B01D 35/2208; B01D 35/2209; B01D 35/3201; G06N 5/00; G06N 5/01
See application file for complete search history.

(56) References Cited

U.S. PATENT DOCUMENTS

| | | | | |
|---|---|---|---|---|
| 2003/0111426 A1* | 6/2003 | Jablonsky | ........... | B01D 33/808 |
| | | | | 210/748.05 |
| 2010/0124142 A1* | 5/2010 | Laugharn, Jr | ......... | B01F 33/30 |
| | | | | 366/108 |
| 2012/0216876 A1* | 8/2012 | Gaitan | ...................... | F17D 3/00 |
| | | | | 137/13 |
| 2014/0033808 A1* | 2/2014 | Ding | ...................... | C12M 47/04 |
| | | | | 73/61.75 |
| 2014/0271249 A1 | 9/2014 | Ovchinnikov et al. | | |
| 2017/0260793 A1* | 9/2017 | Muñoz Pelayo | ....... | E05F 5/003 |
| 2018/0341248 A1* | 11/2018 | Mehr | ..................... | B22F 10/00 |
| 2019/0191252 A1* | 6/2019 | Lipkens | ................ | B01D 17/04 |
| 2019/0324444 A1* | 10/2019 | Cella | ....................... | H04L 67/12 |
| 2019/0361008 A1* | 11/2019 | Laugharn, Jr. | ......... | G01N 15/06 |
| 2020/0276579 A1 | 9/2020 | Huang et al. | | |

OTHER PUBLICATIONS

International Search Report and Written Opinion received for PCT Patent Application No. PCT/US2022/014128, mailed on Apr. 27, 2022, 12 pages.
Latifi et al., "Model-free control for dynamic-field acoustic manipulation using reinforcement learning", IEEE Access, vol. 8, 2020, pp. 20597-20606.

* cited by examiner

METHODS AND SYSTEMS FOR DYNAMIC CONTROL OF AN ACOUSTIC FIELD

CROSS-REFERENCE TO RELATED APPLICATION

This application is a 371 U.S. National Phase of International PCT Application No. PCT/US2022/014128, filed Jan. 27, 2022, which claims priority to U.S. Provisional Application No. 63/143,101, filed on Jan. 29, 2021, the entire disclosures of which are incorporated herein by reference in their entirety.

FIELD OF THE DISCLOSURE

The devices and methods described herein generally relate to the dynamic control of acoustic fields, in particular through the use of machine learning.

BACKGROUND

During the past three decades, microfluidics or lab-on-a-chip systems have been attracting increasing interest and emerging as a formidable tool in basic research and for translational applications in chemistry, biology, and medicine. Compared with traditional laboratory techniques, microfluidics technology brings many advantages including reduced sample consumption, system miniaturization, low cost, high throughput, rapid turnaround time, and a precisely controlled microenvironment. So far, the innovative design, fabrication, and integration of microfluidic devices and/or lab-on-a-chip systems has enabled a wide range of applications in disease diagnostics, treatment screening, drug delivery, biomedical assays, artificial organs, chemical reactions, combinatorial synthesis, environmental health, microscale energy systems, etc.

As an active microfluidic technique, acoustofluidics has been developed to improve the versatility and functionality of current microfluidics technologies. By employing acoustic waves into microfluidic devices or lab-on-a-chip systems, acoustofluidics technology provides a unique means to manipulate cells and handle liquids. For example, acoustic radiation force has been employed for the trapping, separation, transportation, sorting, and enrichment of cells. Moreover, acoustic streaming has been used for the pumping, moving, and mixing of liquids, as well as detaching, clustering, and rotation of cells.

Acoustofluidic technology offers useful and unique features and advantages: (1) based on the nature of acoustic waves, acoustofluidic processes provide excellent biocompatibility, contactless operation, and label-free manipulation; (2) acoustofluidic devices are typically comprised of simple, compact, and inexpensive microfluidic devices and acoustic transducers, which can be fabricated through standardized processes in a mass-producible fashion; (3) acoustofluidic devices can also be integrated with simple and compact power supply and detection systems into a portable and user-friendly system allowing portable and daily usage in the research laboratory and hospital. As such, there are efforts to use acoustofluidic and microfluidic technologies from research labs to real-world applications in daily-life and hospital settings.

Current acoustofluidic devices and systems, however, have several hurdles: (1) device-to-device variation: currently, acoustofluidic devices are made through standard micro-electromechanical system (MEMS) fabrication processes in research labs and manufacturing facilities; however, device-to-device variation is commonly required among devices to meet quality standards; for example, to provide good working performance, one acoustofluidic device may require slightly different input settings (e.g., frequency, power, phase angle, or flow rate) than another device; as such, the device-to-device variation increases the difficulty in standardization of acoustofluidic technology. (2) Environmental and temporal factors: the working performance of acoustofluidic devices also depends on environmental and temporal factors; taking the bulk acoustic wave-based cell separation devices as an example, the separation device may have an excellent cell separation performance at room temperature, but provides relatively poor separation results at physiological temperatures due to the heating effect of the device because the temperature increase changes the resonant frequency of the separation device; similarly, high or low temperature may also impact the resonant frequency of the separation device, resulting in the poor working performance of the device, thereby requiring considerable engineering effort to mitigate the impact of environmental and temporal factors and maintain the excellent performance of acoustofluidics in daily life settings. (3) Automation: typically, tremendous manual operation and intervention are required for most acoustofluidic experiments, especially to circumvent of the impact of environmental and temporal factors, and device-to-device variation; these manual operations are labor-intensive, expensive, and significantly limit broad applications in an environment outside of a microfluidic research laboratory; as such, there is a need to develop automatic and standardized acoustofluidic devices and systems for basic research and translational applications in real-world settings.

Machine learning (ML), which is a subset of artificial intelligence (AI), may provide new opportunities for the development of microfluidic and acoustofluidic technologies because this method enables computer algorithms to learn from experience. Recent engineering efforts have been made to combine a variety of ML methods (e.g., supervised learning, and reinforcement learning) with microfluidic devices and lab-on-a-chip systems for broad applications in biomedical sciences from several aspects. Supervised learning has been used to process and analyze data from high throughput microfluidic experiments, addressing the throughput, accuracy, and robustness issues of current manual data handling processes. Supervised learning is a subset of ML methods that learn the mapping function from the input to the output using the training dataset, and then make a prediction for questions such as classification. For example, after being trained with microfluidic experimental results, convolutional neural network (CNN) algorithms have been employed as analyzing tools for cell classification in image-based microfluidic cytometer devices, cell counting in optofluidic chips, and automatic detection and sorting of microencapsulation. Similarly, supervised learning has been employed for the optimization and prediction of microfluidic design and experimentation. For example, deep artificial neural network (DNN) algorithms have been utilized to design microchannel architectures for customized acoustic field and microparticle patterning, microfluidic geometry design, and flow modeling. Different from supervised learning that focuses on balancing exploitation (labeled input/output pairs) and exploration (unlabeled input/output pairs), reinforcement learning (RL) learns from the agent-environment interaction through maximizing the notion of cumulative reward, enabling the most effective method for control problems. Recently, the RL method has been used to address the challenges of dynamic microfluidic system control. For example, Deep Q-Networks, and model-free episodic controllers have been employed to establish an automatic control system for the precise regulation of dynamic laminar flow and microfluidic droplet generation. Compared to manual operation, this RL-based system demonstrated a significant improvement of consistency, robustness, and repeatability during long-term microfluidic experiments. Despite there only being very few attempts, the fusion of RL algorithms and microfluidics has started to show promising potential in building automatic microfluidic systems and maintaining microfluidic performance. Therefore, ML methods, especially RL algorithms, may hold a promising solution to address the above discussed challenges in acoustofluidic experiments.

In a particular example of applying acoustofluidics, there is currently a lack of acoustofluidic dynamic control related to cell growth or organoid growth. The rotational culture of organoids using bioreactors or orbital shakers is a very important step for organoid differentiation and maturation. However, low rotational speed of organoids may lead to insufficient oxygen/nutrient perfusion and poor differentiation, whereas high rotational speed may lead to high mechanical shear stress and surface cell death. Current bulk orbital shakers or bioreactors fail to provide a uniform rotational culture environment for each organoid, limiting the yield of successful organoid formation. The recent advance of miniaturized spinning bioreactor has provided a versatile, simple, cost-effective platform by engineering a multi-well spinning device to a standard 12-well tissue culture plate, providing a better engineering method for brain region-specific organoid formation. However, challenges still remain in improving the organoid culture conditions. Typically, the organoids grow from several hundred microns to several millimeters in diameter during the spinning or rotational culture, and the increased weight of organoids may reduce the rotational speed of the suspended organoid cultures, thereby creating inconsistent conditions for the growth of organoid cultures. Furthermore, the increased size of organoids may cause hypoxia and necrosis, which further negatively impacts the viability of the organoids. Therefore, there is a substantial need to maintain a stable environment in which to grow and grow organoids (e.g., rotational mode, and speed) in order to improve the perfusion of nutrients and oxygen for reducing organoid hypoxia and necrosis during the long-term culture of organoids.

SUMMARY

Examples disclosed herein may reduce some of the shortcomings associated with conventional acoustofluidic methods, devices and systems. The present disclosure describes acoustofluidic methods, devices and systems that provide and include dynamic control of such methods, devices and systems. In relation to the examples directed to cell growth or organoid growth, the acoustofluidic methods, devices and systems of the present disclosure maintain a stable environment in which to grow and grow organoids (e.g., rotational mode, and speed) in order to improve the perfusion of nutrients and oxygen for reducing organoid hypoxia and necrosis during the long-term culture of organoids.

Stated differently, the present disclosure introduces a new way of dynamically controlling an acoustofluidic device. This new method may be referred to as "intelligent acoustofluidics", which is an RL-based closed-loop system for the standardization, optimization, and maintenance of acoustofluidic devices and systems. The integration of advanced RL algorithms enables the automatic, continuous and dynamic operation of different devices and actuators, thereby reducing manual intervention and ensuring consistency under a variety of factors including device-to-device variation, manual operation, environmental factor, sample variability, etc. Compared to current systems, which are heavily dependent on manual intervention, this intelligent system provides better performance in terms of automation, robustness, and accuracy. Most importantly, such intelligent systems may significantly contribute to pushing biodevices and sensors from the research laboratory to their translational applications in real-world settings.

In a particular application, namely the dynamic control of an acoustic device that is used in conjunction to control the rotation of a rotor in a cell growth system is provided. Such a system may be referred to as an intelligent acoustofluidic rotational system (IARS), which is disclosed herein. Compared with current bioreactors and orbital shakers, the present IARS has several unique advantages for growing an organoid culture, particularly, (1) the closed-loop control of rotating cultures, (2) mitigating inconsistency potentially associated with rotation, (3) the introduction of perfusion scaffolds, (4) the incorporation of contact-free rotors and (5) generating and creating improved organoids. Regarding the closed-loop control of rotational culture, current organoid culture systems lack a mechanism to check and maintain culture conditions during long-term culture. Through the fusion of a CCD camera, acoustofluidic rotors, and a controller, the IARS of the present disclosure are able to continuously and dynamically track, tune, and maintain the organoid culture condition (e.g., rotational speed) in real-time. Regarding the mitigating the inconsistency potentially associated with rotation, current bulk organoid culture systems have difficulty in providing a consistent rotational culture condition during a long-term culture due to the growth of organoids and manual operations. Through the integration of RL algorithms, the IARS of the present disclosure minimizes system variations and maintains the stability of the rotational speed of organoids with high consistency. Regarding the introduction of perfusion scaffolds, such as 3D printed organoid scaffolds, and coupling the scaffolds with or into the rotor device, the IARS of the present disclosure enhance medium perfusion to reduce or avoid hypoxia and necrosis within the organoids. Regarding incorporation of contact-free rotors, which may include one or more acoustic spiral phase plates (ASPP), such incorporation enables the contact-free rotation of rotors via the regulation of highly biocompatible acoustic pressure fields, thereby avoiding physical damage of the organoid from mechanical contacts. Regarding generating and creating improved organoids, compared with conventional organoid culture methods, the present IARS may generate human cerebral organoids with a more uniform size distribution of ventricular/subventricular zone (VZ/SVZ), and improved differentiation commitment to the forebrain identity.

In summary, the IARS of the present disclosure overcome the challenges posed to current acoustofluidic devices and systems. For example, the IARS of the present disclosure (1) reduce device-to-device variation associated different input settings (e.g., frequency, power, phase angle, or flow rate), (2) account for changes with environmental and temporal factors, such as temperature changes to the surroundings, thereby maintaining the desired rate of cell separation at varying temperature of such surroundings, and (3) increasing automation and decreasing manual intervention, thereby increasing device-to-device consistency.

Examples of some embodiments according to the present disclosure are as follows.

In an Example 1, a non-transitory computer readable medium has a computer program stored thereon for controlling an acoustic field to rotate a rotor, the computer program comprises instructions for causing one or more processors to: provide a signal to an acoustic transducer, wherein the acoustic transducer is configured to generate an acoustic field for rotating a rotor, wherein the signal has a plurality of characteristics comprising amplitude, frequency and phrase; set an attribute of the rotor, wherein the attribute comprises a range; and monitor the attribute of the rotor and using a machine-learning algorithm to dynamically control the attribute of the rotor, wherein the machine learning algorithm uses a Markov Decision Process to: (i) measure the attribute of the rotor using a sensor upon altering the attribute of the rotor the amount by adjusting at least one of the plurality of characteristics of the signal; (ii) calculate the output of the of the acoustic field associated with altering the attribute of the rotor the amount; (iii) calculate a resulting reward based on (a) altering the attribute of the rotor an amount and (b) a resulting output of the of the acoustic field associated with altering the attribute of the rotor the amount; (iv) calculate a maximal reward value based upon an accumulation of the resulting reward and previous resulting rewards; (v) alter the attribute of the rotor based on a control policy and the maximal reward value, wherein the attribute is altered by adjusting the at least one of the plurality of characteristics of the signal or another one of the plurality of characteristics of the signal; and (vi) repeating steps (i) through (v) while maintaining the desired attribute of the rotor within the range.

In an Example 2, such that the non-transitory computer readable medium of Example 1 further comprises updating the control policy based upon on whether the maximal reward has been achieved.

In an Example 3, such that the non-transitory computer readable medium of Example 2, wherein updating the control policy based upon on whether the maximal reward has been achieved is performed between (iv) and (v) or between (v) and (vi).

In an Example 4, such that the non-transitory computer readable medium of Example 1 wherein the attribute is altered by adjusting at least one of the plurality of characteristics comprising amplitude, frequency and phrase.

In an Example 5, such that the non-transitory computer readable medium of Example 1 or 2, wherein the attribute of the rotor comprises a rotor speed.

In an Example 6, such that the non-transitory computer readable medium of any preceding Example, wherein the output of the acoustic field is an amount of energy produced by the acoustic field.

In an Example 7, such that the non-transitory computer readable medium of Example 1, wherein the acoustic field is configured to interact with a fluid in which the rotor is disposed.

In an Example 8, such that the non-transitory computer readable medium of Example 5, wherein the output of the acoustic field is a temperature of the fluid.

In an Example 9, such that the non-transitory computer readable medium of Example 1, wherein the computer program further comprises instructions for causing one or more processors to calculate one or more parameters of the acoustic field upon providing the signal to the acoustic transducer.

In an Example 10, such that the non-transitory computer readable medium of any of the preceding Examples, wherein the machine learning algorithm further uses the Markov Decision Process to: confirm whether the attribute of the rotor remains within a first limit upon altering the attribute of the rotor the amount; and confirm whether the output of the of the acoustic field associated with altering the attribute of the rotor the amount remains within a second limit upon altering the attribute of the rotor the amount.

In an Example 11, a method for controlling a fluid characteristic within a medium through an acoustic field, the method comprises the steps of: providing a signal to an acoustic transducer, wherein the acoustic transducer is configured to generate an acoustic field to rotate a rotor, wherein the signal has a plurality of characteristics comprising amplitude, frequency and phrase; calculating one or more parameters of the acoustic field upon providing the signal to the acoustic transducer; setting a desired attribute of the rotor upon being subject to the acoustic field, wherein the desired attribute comprises a desired range; and monitoring the attribute of the rotor and using a machine-learning algorithm to dynamically control the attribute of the rotor, wherein the machine learning algorithm uses a Markov Decision Process to: (i) measure the attribute of the rotor using a sensor upon altering the attribute of the rotor the amount by adjusting at least one of the plurality of characteristics of the signal; (ii) calculate the output of the of the acoustic field associated with altering the attribute of the rotor the amount; (iii) calculate a resulting reward based on (a) altering the attribute of the rotor an amount and (b) a resulting output of the of the acoustic field associated with altering the attribute of the rotor the amount; (iv) calculate a maximal reward value based upon an accumulation of the resulting reward and previous resulting rewards; (v) alter the attribute of the rotor based on a control policy and the maximal reward value, wherein the attribute is altered by adjusting the at least one of the plurality of characteristics of the signal or another one of the plurality of characteristics of the signal; and (vi) repeating steps (i) through (v) while maintaining the desired attribute of the rotor within the range.

In an Example 12, such that the method of Example 11 further comprises updating the control policy based upon on whether the maximal reward has been achieved.

In an Example 13, such that the method of Example 12, wherein updating the control policy based upon on whether the maximal reward has been achieved is performed between (iv) and (v) or between (v) and (vi).

In an Example 14, a system for controlling the behavior of a cell mass, the system comprises: a medium in which the cell mass is immersed; a rotor configured to alter a characteristic of the medium; an acoustic transducer configured to alter the characteristic of the medium through at least the rotor; a sensor configured to measure the characteristic; and a non-transitory computer readable medium having a computer program stored thereon, the computer program comprising instructions for causing one or more processors to: provide a signal to the acoustic transducer, wherein the acoustic transducer is configured to generate an acoustic field to rotate a rotor, wherein the signal has a plurality of characteristics comprising amplitude, frequency and phrase; set an attribute of the rotor upon being subject to the acoustic field, wherein the attribute comprises a range; and monitor the attribute of the rotor and using a machine-learning algorithm to dynamically control the attribute of the rotor, wherein the machine learning algorithm uses a Markov Decision Process to: (i) measure the attribute of the rotor using a sensor upon altering the attribute of the rotor the amount by adjusting at least one of the plurality of characteristics of the signal; (ii) calculate the output of the of the acoustic field associated with altering the attribute of the rotor the amount; (iii) calculate a resulting reward based on (a) altering the attribute of the rotor an amount and (b) a resulting output of the of the acoustic field associated with altering the attribute of the rotor the amount; (iv) calculate a maximal reward value based upon an accumulation of the resulting reward and previous resulting rewards; (v) alter the attribute of the rotor based on a control policy and the maximal reward value, wherein the attribute is altered by adjusting the at least one of the plurality of characteristics of the signal or another one of the plurality of characteristics of the signal; and (vi) repeating steps (i) through (v) while maintaining the desired attribute of the rotor within the range.

In an Example 15, such that the system of Example 14 further comprises updating the control policy based upon on whether the maximal reward has been achieved.

In an Example 16, such that the system of Example 15, wherein updating the control policy based upon on whether the maximal reward has been achieved is performed between (iv) and (v) or between (v) and (vi).

In an Example 17, such that the system of Example 14, wherein the medium is a fluid.

In an Example 18, such that the system of Example 17, wherein the characteristic is altered by altering the attribute of the rotor the amount.

In an Example 19, such that the system of Example 17, wherein the cell mass is supported by a scaffold structure coupled to the rotor.

In an Example 20, a non-transitory computer readable medium having a computer program stored thereon for controlling an acoustic field, the computer program comprises instructions for causing one or more processors to: provide a signal to an acoustic transducer, wherein the acoustic transducer is configured to generate an acoustic field, wherein the signal has a plurality of characteristics comprising amplitude, frequency and phrase; set at least two attributes of the acoustic field, wherein the at least two attributes comprise corresponding ranges; and monitor the two or more attributes of the acoustic field and using a machine-learning algorithm to dynamically control one of the at least two attributes of the acoustic field, wherein the machine learning algorithm uses a Markov Decision Process to: (i) measure the attribute of the one of the at least two attributes of the acoustic field using a sensor upon altering the one of the at least two attributes of the acoustic field the amount; (ii) calculate the output of the other of the at least two attributes of the acoustic field associated with altering the one of the at least two attributes of the acoustic field the amount; (iii) calculate a resulting reward based on altering the one of the at least two attributes of the acoustic field the amount and based on the output of the other of the at least two attributes of the of the acoustic field associated with altering the one of the at least two attributes of the acoustic field the amount; (iv) calculate a maximal reward value based upon an accumulation of the resulting reward and previous resulting rewards; (v) alter the one of the at least two attributes of the acoustic field based on based on a control policy and the maximal reward value, wherein the attribute is altered by adjusting the at least one or another one of the plurality of characteristics of the signal or another one of the plurality of characteristics of the signal; and (vi) repeating steps (i) through (v) while maintaining the one of the two or more attributes of the acoustic field within the range.

In an Example 21, such that the non-transitory computer readable medium of Example 20 further comprises updating the control policy based upon on whether the maximal reward has been achieved.

In an Example 22, such that the non-transitory computer readable medium of Example 20, wherein updating the control policy based upon on whether the maximal reward has been achieved is performed between (iv) and (v) or between (v) and (vi).

In an Example 23, such that the non-transitory computer readable medium of Example 20, wherein the machine-learning algorithm comprises a neural network.

In an Example 24, such that the non-transitory computer readable medium of Example 20, wherein the machine-learning algorithm comprises fuzzy logic.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" may be used interchangeably herein. It is also to be noted that the terms "comprising", "including", and "having" may be used interchangeably.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure may be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

It should be understood that the drawings and replicas of the photographs are not necessarily to scale. In certain instances, details that are not necessary for an understanding of the disclosure or that render other details difficult to perceive may have been omitted. It should be understood, of course, that the disclosure is not necessarily limited to the particular examples or embodiments illustrated or depicted herein.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Methods and systems for dynamic acoustic control are provided. The methods and systems described herein may be utilized in any setting for acoustic control, including but not limited to controlling or growing cell masses, medical testing, microfluidics, operations on a patient, in-vivo cell studies, and combinations thereof. It should be understood that while some embodiments as disclosed herein relate to controlling acoustic fields for cell growth and/or manipulation, the methods of dynamic acoustic control can be used in any setting.

Figure 4:
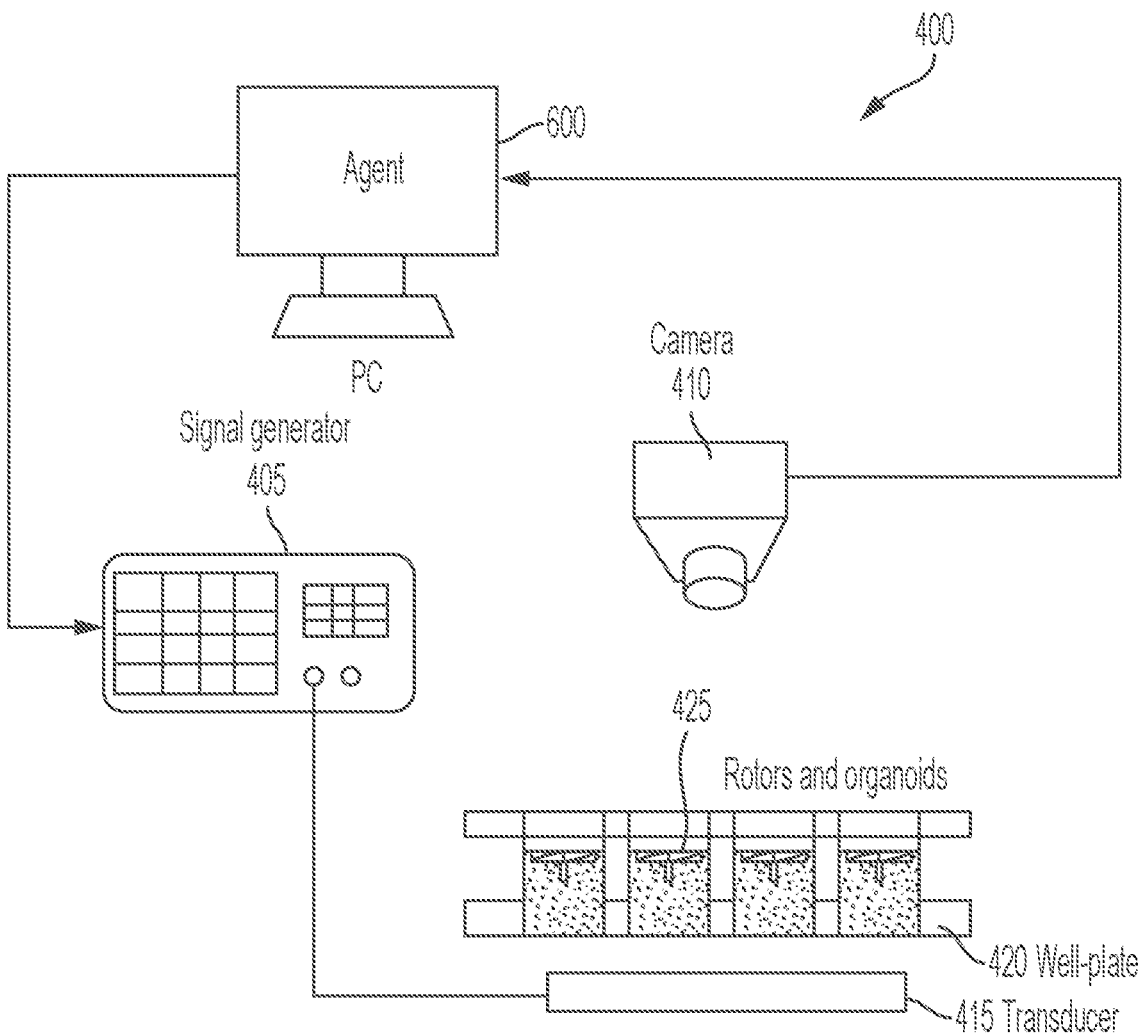
FIG. 4 is a system for controlling an acoustic field.

Referring to FIG. 4, there is depicted an exemplary embodiment of acoustofluidic system 400 arranged and configured to create and dynamically control an acoustic field within a fluid to grow cells into organoids. The acoustofluidic system 400 comprises a computing system 600, which may also be referred to as a decision agent 600, a signal generator 405, a sensor 410, a transducer 415, a number of vessels 420, and a number of rotors 425. In the illustrated embodiment, the computing system 600 instructs the signal generator 405 to produce a signal having a plurality of characteristics comprising amplitude, frequency and phrase to the transducer 415. Upon receiving the signal from the signal generator 405, an acoustic field is created and the rotors 425 are activated (e.g., rotated). The acoustic field has at least one attribute, and in this case, it is directly related to the speed at which the fluid or rotors rotate. The vessels 420 and/or the rotors may additionally support a cell mass which may be acted upon by the acoustic field and/or the acoustic signal from the transducer 415. The sensor 410 is illustrated as a camera, but may be any sensor as described herein. The sensor 410 monitors an attribute of at least one of the rotor 425, the vessels 420 and/or the contents of the vessels. Based on the reading or signal from the sensor representative of the attribute, the decision agent 600 continuously alters the signal produced by the signal generator 405, and in turn alters the output of the transducer 415, namely the acoustic field in the well plate. In short, the acoustofluidic system 400 is a closed loop system configured to continuously monitor the attribute (i.e., speed of fluid determined by calculating speed of rotor rotation) and dynamically adjust the acoustic field (by altering the characteristics of the signal delivered by the signal generator 405 to the transducer 415) in order to maintain the desired value of the attribute. The system 400 may be configured to implement method 100 and/or method 300 as described herein.

In an exemplary embodiment, the decision agent 600 comprises a machine learning algorithm. Machine learning algorithms may be considered a subset of artificial intelligence, and are generally configured to build a model of a system based on sample data in order to make predictions and improve behavior over time. The machine learning algorithm of the present disclosure may be reward-based and may be configured to optimize certain parameters of a system. Additionally, the machine learning algorithm may comprise a deep artificial neural network, a convolutional neural network, fuzzy logic, Bayesian networks, genetic algorithms, and combinations thereof. Furthermore the machine learning algorithm may be taught through supervised learning, unsupervised learning, semi-supervised learning, reinforcement learning, self-learning, anomaly detection, and combinations thereof.

Figure 1A:
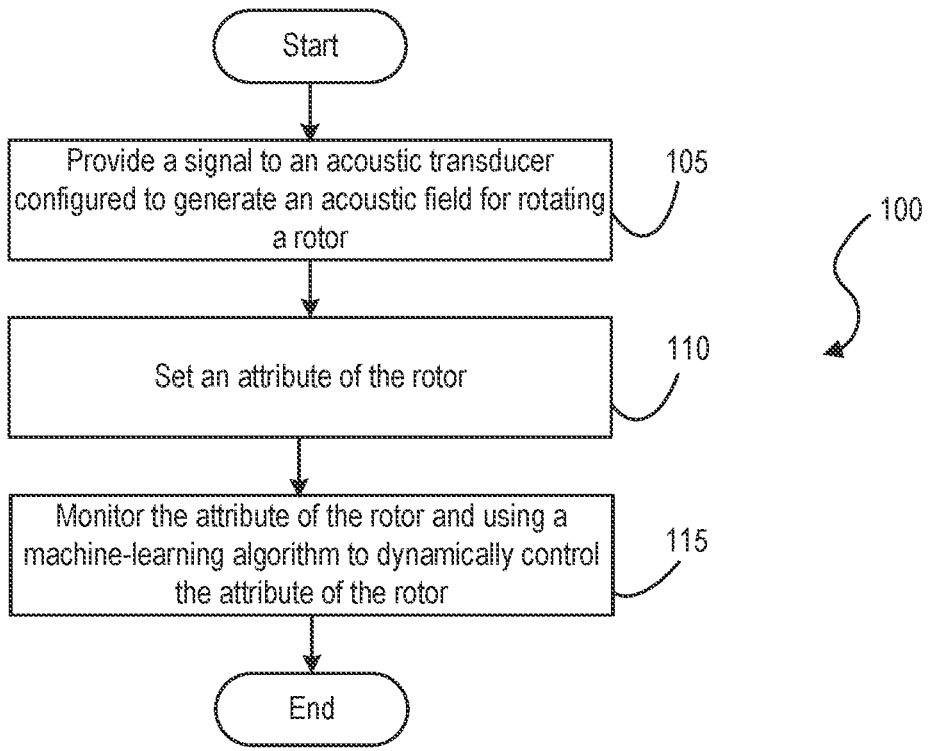
FIG. 1A is a flowchart for a method of controlling an acoustic field.

FIG. 1A illustrates a flowchart of a method 100 for controlling an acoustic field to rotate a rotor. The rotor may be in any system, for example within a fluid medium configured to grow a cell mass. The method 100 is configured to be implemented by a computer system and may be executed by one or more processors as described herein.

Step 105 of method 100 comprises providing a signal to an acoustic transducer configured to generate an acoustic field for rotating the rotor. The signal comprises a plurality of characteristics, comprising amplitude, frequency, and phase. Each of the characteristics of the signal are configured to be altered in order to change the acoustic field. Step 110 comprises setting an attribute of the rotor, wherein the attribute comprises a range. Examples of attributes include, but are not limited to, rotation speed, rotation time, rotation direction, rotor position, and combinations thereof. The range of the attribute may be set by a user, or by a control system configured to maintain certain parameters. The range may also be dynamic and may change over time.

Figure 1B:
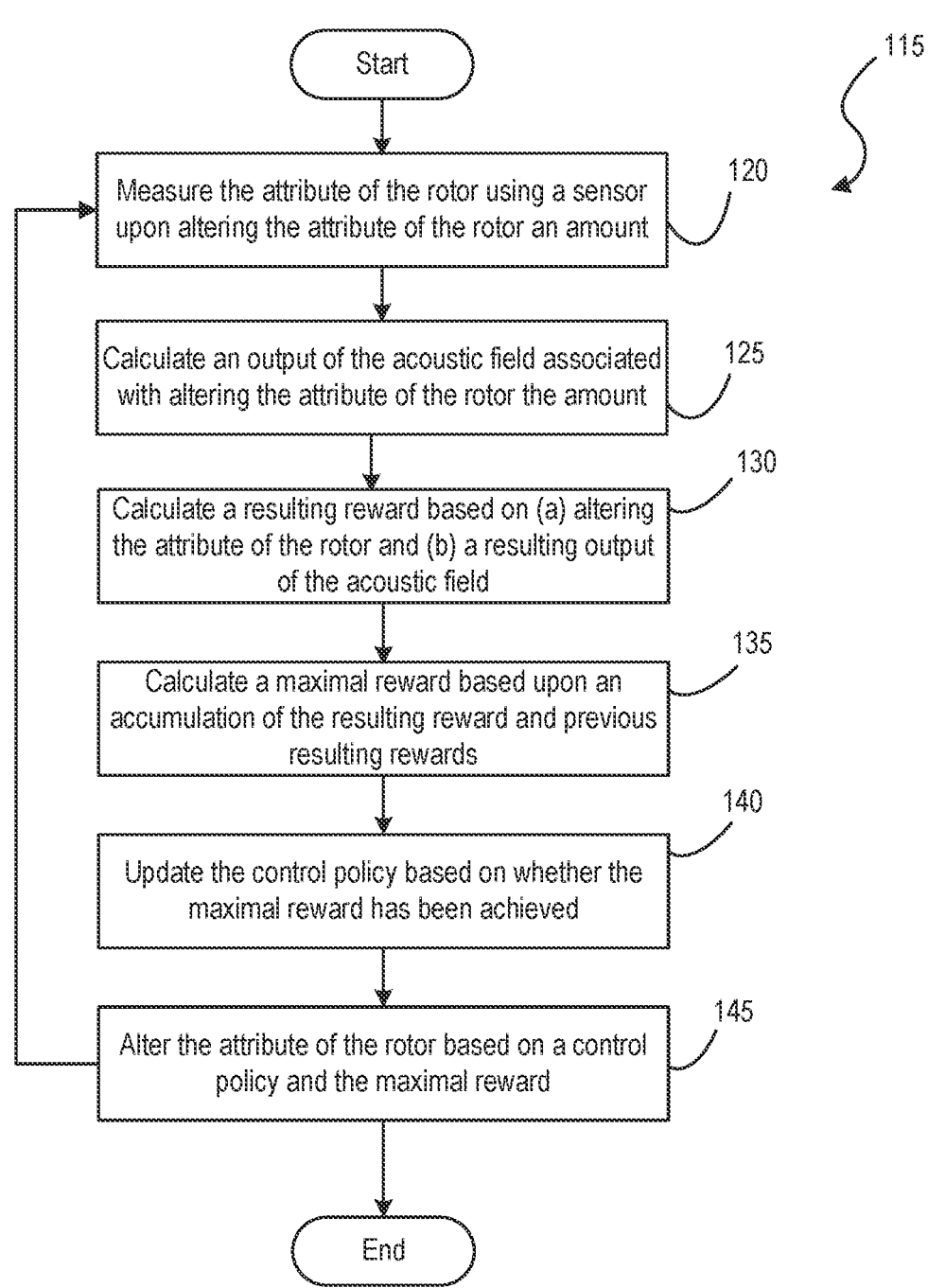
FIG. 1B is a flowchart for a Markov Decision Process as in FIG. 1A.

Step 115 comprises monitoring the attribute of the rotor and using a machine-learning algorithm to dynamically control the attribute of the rotor, wherein the machine learning algorithm uses a Markov Decision Process (MDP). Step 115 comprises multiple steps, and is illustrated in FIG. 1B. The machine-learning algorithm may be a reinforcement-learning (RL) algorithm. Generally, the MDP is configured to calculate rewards to dynamically control attributes of an acoustic field system. As an example, the MDP may be implemented to control rotation of a rotor for a system configured to grow a cell mass or an organoid. In such embodiment, the MDP is configured to maintain a stable rotation of the cell mass over a period of time by maximizing a reward. The MDP may function according to the following details:

The state of the MDP may be defined as the current RF signal parameters and rotational speed of the rotor as $$S_t = \left( F_t^{out}, P_t^{out}, V_t \right)$$

where $S_t$ is the state at time t, $$F_t^{out}, P_t^{out}$$

are the frequency and power of the output RF signal, and $V_t$ is the current rotational speed of the rotor.

The action of the MDP may be defined as the frequency and power of the resetting RF signal as $$A_t = \left( F_t^{set}, P_t^{set} \right)$$

where $A_t$ is the action at time t, $$F_t^{set}, P_t^{set}$$

are the frequency and power of the RF signal selected by the controller based on the current state observation, can be represented as $$A_t = \pi(S_t)$$

where $\pi$ is the control policy for the control of rotation.

The reward of the MDP may be divided into two parts based on the control goal, the penalty for the rotational speed variation from the set goal, and the penalty for the influence of acoustic power. Specifically, as the rotational speed deviates from the set rotational speed or more power is provided to the PZT transducer (which is undesirable for the health of the organoid), the reward decreases. The surrounding microenvironment of the cell mass can be regarded as stable when the rotational speed is within a small range. Thus, we set this range as [−D, D], where D is the threshold for the stable environment value. Within this range, the penalty from the rotational speed will be zero. Otherwise, the penalty will be calculated based on the difference between the set and the current rotational speed. By joining the two parts together, we set the overall reward of the MDP as $$R_t(S_t) = -\beta P_t^{out} + \begin{cases} 1, & |V_t - V_{goal}| < D \\ -|V_t - V_{goal}|, & |V_t - V_{goal}| > D \end{cases}$$

where $R_t$ is the reward for time t and $\beta$ is the weight of the acoustic power. $\beta$ represents the importance of acoustic power when compared to rotational speed control. In one example, the stable rotational speed control may be more important than the acoustic power. Thus, $\beta$ would be set to be a small value and will be minimized after achieving the rotational speed threshold.

Reward maximization: The goal of the MDP is to maximize the overall discount reward overtime by deriving the optimal rotational control policy for acoustic amplitude optimization and stable rotational speed control, mathematically, the objective is $$\max_{\pi} \sum_{t'=0}^{\infty} \gamma^{t'} R_{t+t'}(S_{t+t'})$$

where $\gamma$ is the discount factor. The machine learning algorithm is configured to optimize the rewards.

The rotational control is a continuous problem and requires a continuous selection of acoustic parameters. Thus, the overall control method may adopt Deep Deterministic Policy Gradients (DDPG) methods. DDPG is a natural solution for rotational control, because the action space of DDPG is continuous, and the setting parameters of the RF signal from the outputs of DDPG can be obtained directly. With DDPG, the network only has two outputs, namely, the real-valued set-points of frequency and amplitude of the RF signals. While this particular embodiment of a dynamic control method according to the present disclosure involves rotating a rotor, the same methods and equations may be used with other parameters to dynamically control acoustic fields in any other setting and may be used to control other devices or parameters.

Referring again to FIG. 1A, Step 115 comprises monitoring the attribute of the rotor and using a machine-learning algorithm to dynamically control the attribute of the rotor, wherein the machine learning algorithm uses a Markov Decision Process (MDP). Step 115 comprises multiple steps, represents the action of the machine learning algorithm using an MDP and is illustrated in FIG. 1B. The multiple steps of Step 115 may include Steps 120 through 145.

Step 120 comprises measuring the current attribute of the rotor using a sensor upon altering the attribute of the rotor an amount by adjusting at least one of the plurality of characteristics of the signal. The sensor may be any suitable sensor configured to monitor the desired attribute, wherein the sensor may include, but is not limited to, cameras, thermometers, flowmeters, electromagnetic radiation sensors (e.g. radio, infrared, visual, ultraviolet, microwave, x-ray, and gamma ray radiation sensors), motion sensors, concentration sensors, electrochemical sensors, pH sensors, and combinations thereof. The desired attribute may be the speed of the rotor or another operational parameter or characteristic of the rotor. The desired attribute may also be based on one or a combination of other operational parameter or characteristic of the system, such as fluid characteristics (e.g., speed, movement, temperature, viscosity, etc.).

Step 125 comprises calculating an output of the acoustic field associated with altering the attribute of the rotor the amount. The output of the acoustic field may be an acoustic field output energy or one of the plurality of characteristics of the acoustic field (e.g. phase, amplitude, frequency). Additionally, the output of the acoustic field may be an indirect output of the field, such as a temperature of a fluid medium or an organoid. Step 130 comprises calculating a resulting reward based on (a) altering the attribute of the rotor an amount and (b) a resulting output of the acoustic field associated with altering the attribute of the rotor the amount. The reward may be calculated based on desired operating parameters for the system, including rotor attributes as previously discussed. The target goal may also be based on other parameters in the system, such as fluid characteristics (speed, movement, temperature, viscosity, etc.), or other characteristics of the given system. Any reward value as described may be any value, for example a number between zero and one.

Step 135 calculating a maximal reward value based upon an accumulation of the resulting reward and previous resulting rewards. Step 140 comprises updating the control policy based upon on whether the maximal reward has been achieved. Step 145 comprises altering the attribute of the rotor based on a control policy and the maximal reward value, wherein the attribute is altered by adjusting the at least one of the plurality of characteristics of the signal or another one of the plurality of characteristics of the signal. The control policy may include any and/or all of the outputs of Steps 120 to 135. Any combination of the Steps 120 to 145 may be repeated while maintaining the desired attribute of the rotor within the range. Also, although Steps 120 to 145 are depicted as being performed in a particular order, it shall be understood that these steps may be performed in any order or concurrently with other steps.

To summarize, the machine learning algorithm in method 100 is configured to alter parameters of the system by altering an acoustic field in order to optimize certain parameters. In some embodiments, the dynamic control algorithm may be configured to optimize rotor speed or fluid agitation while minimizing the temperature of a fluid, where the temperature may rise due to an increase in output from the acoustic transducer.

Figure 2:
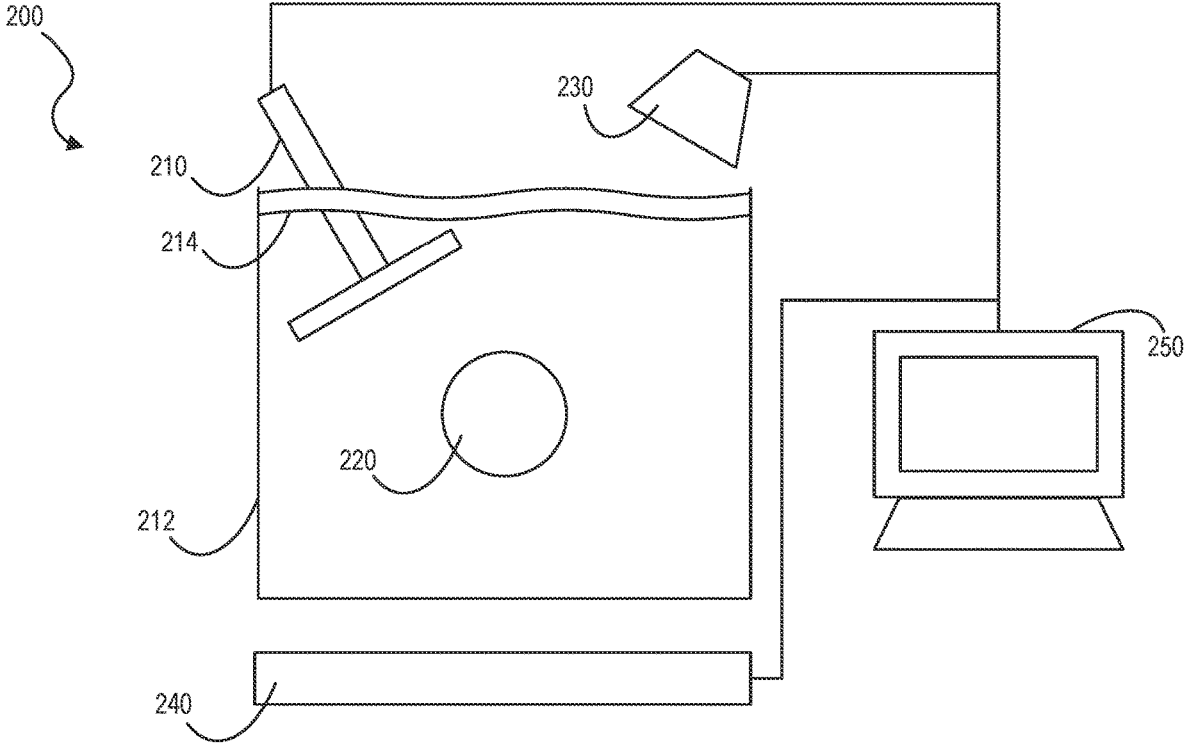
FIG. 2 is a system for controlling the behavior of a cell mass.

FIG. 2 illustrates a simplified diagram of a system 200 for regulating parameters or attributes of a cell mass 220 suspended in a medium 214. The system comprises a vessel 212 which holds a fluid or medium 214, and a cell mass 220. The vessel 212 may be any suitable container to support growth of a cell mass 220, including well plates, beakers, vials, or any other containment device. The medium 214 may be any fluid configured to support growth of cells, such as aqueous solutions, saline solutions, cell growth medium, or any other suitable fluid. The cell mass 220 is generally a plurality of cells, and may comprise a tissue sample, an organoid, a tumor, or any other number of cells. As will be described in more detail, the cell mass 220 may be suspended in the fluid or supported by a structure which may be coupled to a part of system 200 such as a rotor 210. The rotor 210 may be composed of any material, for example a polymer, and may be formed from additive manufacturing (e.g. 3D printing). The system 200 also comprises an acoustic transducer 240, a sensor 230, and a computer 250. The acoustic transducer 240 is configured to transmit an acoustic signal to at least the rotor 210, thereby activating the rotor 210. Changes in the parameters of the acoustic signal, such as the amplitude, frequency, and phase, may affect the behavior of the rotor 210, which in turn affects the medium 214 and the cell mass 220. The acoustic signal from the acoustic transducer 240 may also affect the medium 214 directly. For example, the acoustic signal may supply energy to the medium, thereby increasing the temperature of the medium.

The sensor 230 is configured to monitor a parameter or an attribute of at least one of the rotor 210, the medium 214, and/or the cell mass 220. The sensor 230 may comprise any of the previously described sensors, and may monitor any suitable attributes or parameters, including, but not limited to, rotor speed, rotation time, rotation direction, rotor position, temperature, pH, fluid motion, cell mass motion, cell mass position, cell mass size, fluid level, fluid concentration, reaction progress, acoustic field parameters, and combinations thereof. In some embodiments, the sensor 230 is an acoustic transducer, which may be the same transducer as acoustic transducer 240.

Figure 6:
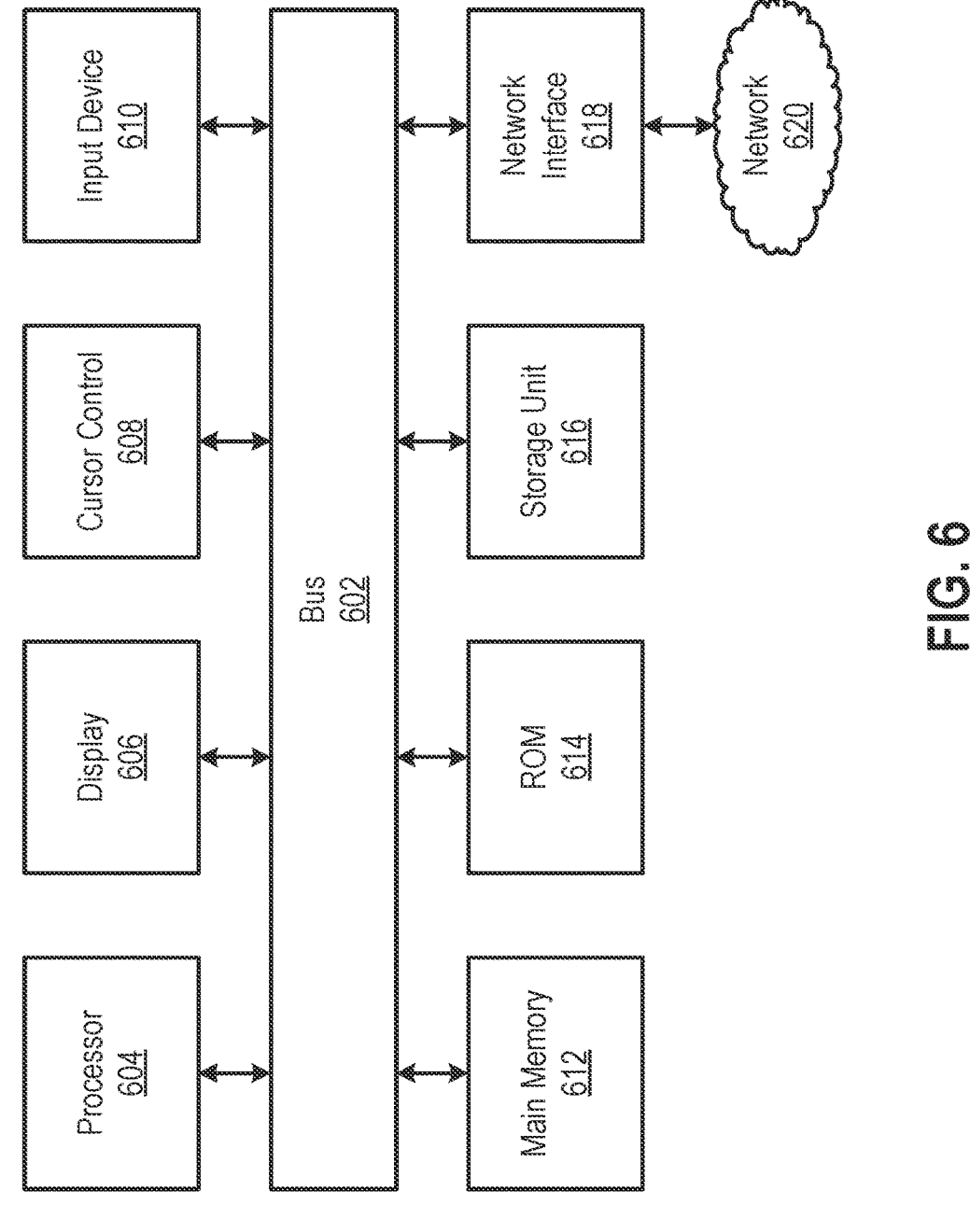
FIG. 6 is a block diagram of a computer system.

The computer 250, while shown as a typical desktop computer, may comprise any computer system. An example of a typical computer system is shown in FIG. 6. The computer 250 comprises non-transitory computer readable medium which is configured to implement at least the method 100. In general, the computer 250 is configured to receive inputs from at least the sensor 230 and send outputs to at least the rotor 210 and acoustic transducer 240.

In the illustrated embodiment, computer 250 implements method 100 to control behavior of the cell mass 220 by altering an attribute of the rotor 210. In other embodiments, the computer 250 may control cell mass 220 behavior by altering any instrument or device thorough a method similar to method 100. Examples of devices include, but are not limited to, other forms of fluid agitators, aerators, heating devices (e.g. heating mantle), inlet/outlet valves, stir bars, injection devices, rocker devices, or any other device that may alter parameters of the medium 214 or the cell mass 220.

Figure 3A:
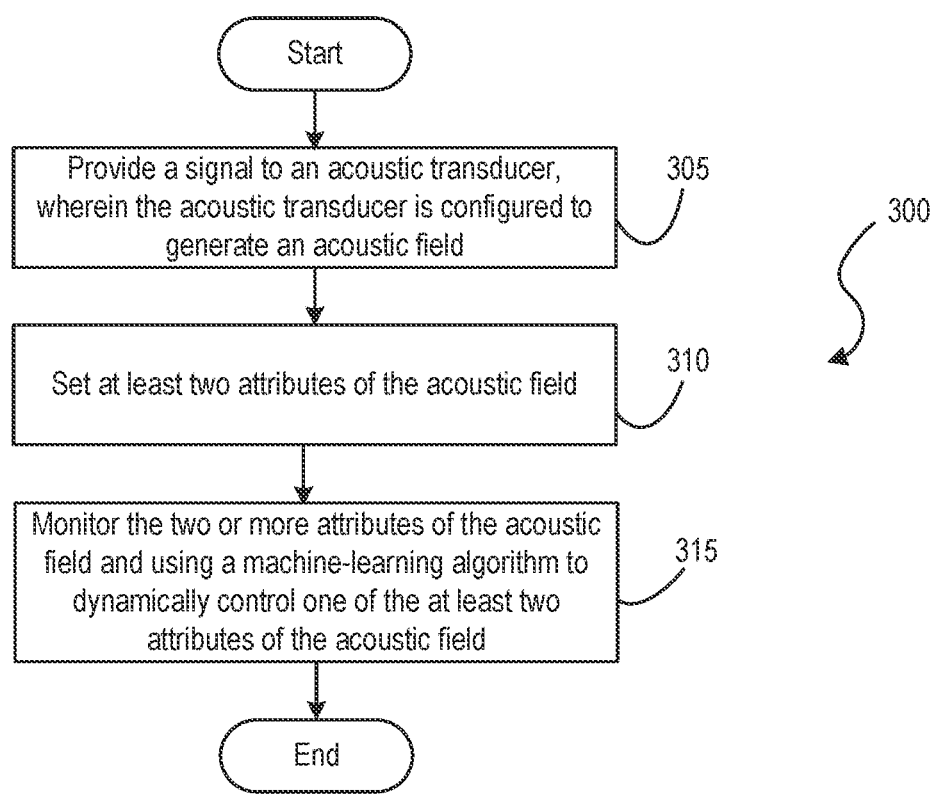
FIG. 3A is a flowchart for another embodiment of a method of controlling an acoustic field.

Referring now to FIG. 3A, a method 300 is shown for controlling an acoustic field. Step 305 comprises providing a signal to an acoustic transducer, wherein the acoustic transducer is configured to generate an acoustic field, wherein the signal has a plurality of characteristics comprising amplitude, frequency and phrase. Step 310 comprises setting at least two attributes of the acoustic field, wherein the at least two attributes comprise corresponding ranges. Examples of attributes of the acoustic field include any acoustic output, such as the parameters including amplitude, frequency, and phase, as well as output energy or intensity. Attributes of the acoustic field may also include attributes that are indirectly influenced by the acoustic field, such as the behavior of any device, such as a rotor, in the acoustic field, or the behavior of a cell mass or a fluid.

Figure 3B:
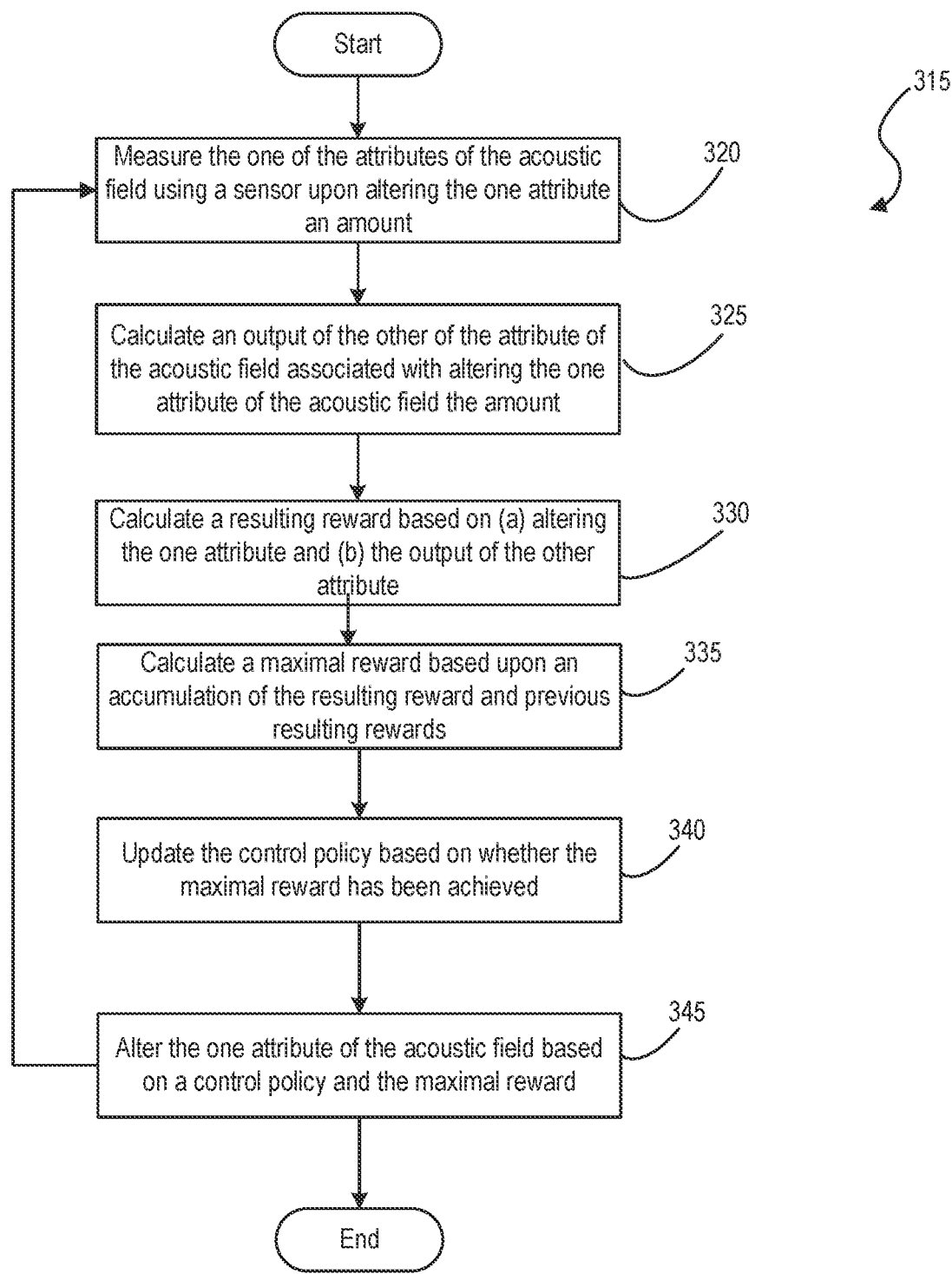
FIG. 3B is a flowchart for a Markov Decision process as in FIG. 3A.

Step 315 comprises monitoring the two or more attributes of the acoustic field and using a machine-learning algorithm to dynamically control one of the at least two attributes of the acoustic field, wherein the machine learning algorithm uses a Markov Decision Process. Step 315 comprises multiple steps, which are detailed in FIG. 3B, and may include Steps 320 through 350. Step 320 comprises measuring the attribute of the one of the at least two attributes of the acoustic field using a sensor upon altering the one of the at least two attributes of the acoustic field the amount. Step 325 comprises calculating the output of the other of the at least two attributes of the acoustic field associated with altering the one of the at least two attributes of the acoustic field the amount. Step 330 comprises calculating a resulting reward based on (a) altering the one of the at least two attributes of the acoustic field the amount and (b) the output of the other of the at least two attributes of the acoustic field associated with altering the one of the at least two attributes of the acoustic field the amount. Step 335 comprises calculating a maximal reward value based upon an accumulation of the resulting reward and previous resulting rewards. Step 340 comprises updating the control policy based upon on whether the maximal reward has been achieved. Step 345 comprises altering the one of the at least two attributes of the acoustic field based on a control policy and the maximal reward value, wherein the attribute is altered by adjusting the at least one of the plurality if characteristics of the signal or another one of the plurality of the characteristics of the signal. The control policy may include any and/or all of the outputs of Steps 320 to 335. Any combination of the Steps 320 to 345 may be repeated while maintaining the one of the two or more attributes of the acoustic field within the range. Also, although Steps 320 to 345 are depicted as being performed in a particular order, it shall be understood that these steps may be performed in any order or concurrently with other steps.

Figure 5A:
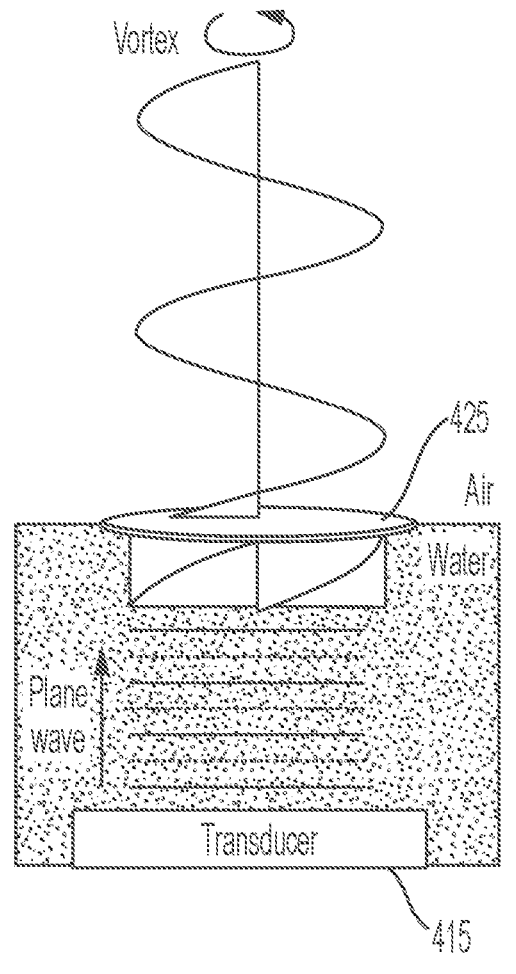
FIGS. 5A and 5B illustrate a rotor according to an embodiment of the disclosure.
Figure 5B:
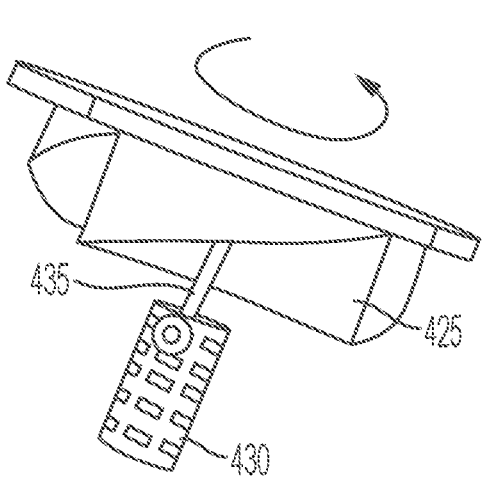

Referring now to FIGS. 5A-B, an exemplary embodiment of a rotor 425 is shown. Rotor 425 may be used in any fluid medium, and is configured to be activated by an acoustic transducer 415. As shown in FIG. 5A, the acoustic transducer 415 is configured to send an acoustic wave towards rotor 425, which then actuates rotation of rotor 425 to generate a vortex within a fluid. FIG. 5B illustrates a support structure 430 coupled to rotor 425 through a coupling rod 435. The support structure 430 is configured to support a cell mass or an organoid, and rotation of rotor 425 encourages fluid flow through and/or around the cell mass on/in support structure 430. Rotation of rotor 425 may rotate a fluid in which rotor 425 is positioned, as well as rotate the cell mass itself within the fluid. Exemplary embodiments of support structures 430 are disclosed in U.S. patent application 63/137,787 to Guo, Feng and filed on Jan. 15, 2021, the entire disclosure of which is incorporated herein.

FIG. 6 is an illustration of a block diagram of an example computer system which may be used to implement all or certain or a combination of the methods illustrated in FIGS. 1 and 3, and/or implement all or certain or a combination aspects of the examples discussed herein. For example, some or all of the methods 100, 115, 300, and/or 315 may be performed using the computer system 600, which is also depicted in FIG. 4, and is part of the system 400 for implementing such methods. The block diagram of FIG. 6 is merely an example, which should not unduly limit the scope of the claims. One of ordinary skill in the art would recognize many variations, alternatives, and modifications.

The computing system 600 includes a bus 602 or other communication mechanism for communicating information between, a processor 604, a display 606, a cursor control component 608, an input device 610, a main memory 612, a read only memory (ROM) 614, a storage unit 616, and/or a network interface 618. In some examples, the bus 602 is coupled to the processor 604, the display 606, the cursor control component 608, the input device 610, the main memory 612, the ROM 614, the storage unit 616, and/or the network interface 618. And, in certain examples, the network interface 618 is coupled to a network 620.

In some examples, the processor 604 includes one or more general purpose microprocessors. In some examples, the main memory 612 (e.g., random access memory (RAM), cache and/or other dynamic storage devices) is configured to store information and instructions to be executed by the processor 604. In certain examples, the main memory 612 is configured to store temporary variables or other intermediate information during execution of instructions to be executed by processor 604. For example, the instructions, when stored in the storage unit 616 accessible to processor 604, render the computing system 600 into a special-purpose machine that is customized to perform the operations specified in the instructions. In some examples, the ROM 614 is configured to store static information and instructions for the processor 604. In certain examples, the storage unit 616 (e.g., a magnetic disk, optical disk, or flash drive) is configured to store information and instructions.

In some embodiments, the display 606 (e.g., a cathode ray tube (CRT), an LCD display, or a touch screen) is configured to display information to a user of the computing system 600. In some examples, the input device 610 (e.g., alphanumeric and other keys) is configured to communicate information and commands to the processor 604. For example, the cursor control 608 (e.g., a mouse, a trackball, or cursor direction keys) is configured to communicate additional information and commands (e.g., to control cursor movements on the display 606) to the processor 604.

In summary, methods and systems are disclosed for dynamically controlling an acoustic field through a machine learning algorithm utilizing a Markov Decision Process. The algorithm is configured to optimize attributes of the system related to an acoustic field provided by an acoustic transducer, such as a speed of a rotor, a fluid condition, and a cell mass condition. Additionally, the methods and systems may be implemented to support the growth of a cell mass or an organoid.

EXAMPLES

Rotor Design and Fabrication

Acoustic Spiral Phase Plate (ASPP) based rotors were selected. These rotors consisted of an ASPP and a hollow scaffold for organoid culture in our IARS. The ASPP was designed as a chiral plate with an azimuthally varying thickness $e = \ell \varepsilon[1-\phi/(2\pi)]$, with $\ell$ an integer for topological charge and $\phi$ the azimuthal angle in the transverse plane with respect to the beam propagation axis, $$\varepsilon = \frac{1}{f\left(c_1^{-1} - c_2^{-1}\right)},$$

with f the frequency of the sound wave, $c_1$ the sound speed in the medium surrounding the ASPP and $c_2$ the sound speed in the material. A normally incident axisymmetric acoustic wave propagating through the SPP carried a pressure field with an azimuthal dependence of the form $\exp(i\ell\phi)$, also known as an acoustic vortex with topological charge $\ell$. Under a plane acoustic field, the ASPP generated orbital angular momentum (OAM) to transfer incident acoustic waves into the acoustic vortex. Due to angular momentum conservation, such an acoustical vortex carrying nonzero acoustic OAM induced a nonzero acoustic radiation torque exerted on the ASPP. This acoustic torque induced mechanical actions to drive rotation around the beam propagation axis.

A numerical model was used to calculate the field distribution of acoustic pressure and phase of the acoustic vortex generated by the ASPP. This model considered the effects of the longitudinal vibrations in the liquid and the interface between the ASPP and the liquid in the cell culture well. The working frequency of the ASPP was set to 2 MHz, within the frequency range of widely used medical ultrasonic imaging. The diameter of the ASPP was set to 14 mm to fit in the 24 well plates. The parameter that we needed to optimize was the topological charge $\ell$. The acoustical phase and intensity distributions of ASPPs with different topological charges ($\ell = 1,2,4,6$) were simulated. The phase patterns of the acoustical vortex twisted azimuthally at the same number of topological charges. While the intensity patterns of the acoustic vortex presented high areas surrounding the lowest center. As our ASPP of different topological charges were able to generate acoustic vortex, we further investigated the acoustic torque exerted on the ASPP of different topological charges. From the calculation, the acoustic torque applied to the ASPP was proportional to the reflection angle of the spiral surface. The acoustic torque was normalized to $\ell. = 1$) The ASPP with the same operation frequency (2 MHz) and diameter (14 mm), but with different numbers of topological charges ($\ell. = 1,2,4,6$), were produced to perform the experimental validation. As the numbers of identical spiral portions increased before $\ell. = 4$, the corresponding acoustic torque increased correspondingly. To minimize acoustic effects on the biological cultures, we chose an ASPP with a topological charge of $\ell. = 4$ as our design, since this design can generate maximal torque with minimal fabrication complexity.

ASPP based rotor devices were fabricated using a stereolithography 3D printer with clear resin (Formlabs, Massachusetts). The ASPP of the rotor was designed to operate at 2 MHz consisting of 2 parts: a cylindrical base plate of 14 mm diameter and 0.5 mm thickness, and a spiral phase plate with 4 spiral identical portions with diameter 12 mm, angular width $\pi/2$, and height 2.2611 mm Each spiral portion ensures a $2\pi$ (phase delay ramp along the angular direction. Therefore, an $8\pi$ (circulation of the phase delay is produced around the ASPP axis Dynamically Controlling Rotation After optimizing the ASPP-based rotor design, the RL-based controller was developed in the simulation and experimental environments and then integrated into the acoustic rotational system. The RL-based controller was developed in a Markov decision process (MDP) framework. The control agent took in rotational speed (state) as input, and output RF signal (e.g., frequency and amplitude) to the PZT transducer as action. The change of amplitude (action) altered the rotational speed (state) and consequently altered the decision of the control agent. By narrowing the difference between current rotational speed and speed setpoint, the rotational behavior of rotors was controlled by desire. The RL-based controller was first implemented and tested in the pre-built simulation environment. During the training process, the controller continuously altered the RF signals applied onto the PZT transducer, resulting in altered rotational speed. After a fixed number of steps (250 steps in each episode), the environment was reset and the rotor was reset to a random rotational speed (0-80 RPM), and the controller restarted its controlling task. After each episode, we trained the policy neural networks according to the accumulated rewards and learning algorithm and stored the trained network. The reward learning curve was acquired from the simulation environment, after 100 episodes of training, the algorithm maximized the rewards at around 5.

Then, the acquired policy from the simulation environment was transferred to the real experimental environment. The rotation speed of the rotor is monitored by the camera using a classical object tracking algorithm, giving observation to the computer, and reward is also calculated based on the rotation speed. As the rotation speed approaches the desired speed, the reward rises. The computer (agent) takes in the observations from the camera and output actions to the signal generators to control the rotation of the rotor device. By maximizing the rewards, the agent improves performance and controls the rotor at the desired rotational speed. After further 50 episodes of training in the real environment, the controller successfully controlled the rotational speed in the real system. With the further trained policy from the real environment, we demonstrated the customized rotational speed control. With the RL controller, one could control the rotational speed of rotor in the desired pattern.

Dynamic Control with Organoid Culture

We further applied our system to improve brain organoid culture conditions, based on our early experiences of organoid culture protocols. Our IARS was able to spin the brain organoid with a stably controlled axis and speed. The EBs were loaded and cultured into the 3D printed scaffold under the rotor on Day 3. The IARS started to spin the EBs attached onto the 3D printed scaffold of rotors on Day 10 with a stably maintained rotational speed. Here the rotational speed was set as 60 RPM for organoid rational culture, because this optimized speed range was showed to increase oxygenation, reduce "dead core" of the organoid, and minimize potential damage of the organoid viability. During the long-term culture process, the human cerebral organoids were growing, and extending on the printed 3D scaffolds of rotors. The extension of organoids on the 3D printed scaffold of rotors were recorded at Day 10, Day 19, and Day 35. We measured the rotational speed of rotors with the growing organoids on Day 10, Day 19, and Day 35. We found our IARS was able to maintain the rotational speed at 60 RPM regardless of the brain organoid growth during the long-term culture process. The intelligent acoustofluidic rotational system is compatible with brain organoids generation and maintained stable rotational speed and axis for a long period (more than 30 days).

After cultured within our IARS for 35 days, we characterized human cerebral organoids generated by our IARS (AhCOs) via cryo-section, immunofluorescence staining, and gene expression analysis. We also compared the differences between AhCOs and human cerebral organoids produced by a conventional method (hCGs). The PAX6/MAP2 staining of organoid cryo-section indicated the AhCO had more uniformed VZ/SVZ zones than the hCO. Moreover, we found that the distribution of VZ/SVZ zones within AhCOs was more uniformed than that within hCOs via quantitative measurement of more than 10 organoids. We further employed qRT-PCR to determine detailed gene marker expression difference between AhCOs and hCGs. Organoids at Day 35 (neuron maturation stage) were collected, lysed for RNA-extraction, and analyzed for gene expression. Compared to hCOs that express heterogeneous differentiation markers indicative of multiple brain regions, AhCOs showed a higher forebrain fate commitment, with lower gene expression for other brain regions. Thus, our results demonstrated a better differentiation of organoids using our IARS than conventional organoid culture methods.

Various modifications and additions can be made to the embodiments disclosed herein without departing from the scope of the disclosure. For example, while the embodiments described above refer to particular features, the scope of this disclosure also includes embodiments having different combinations of features and embodiments that do not include all of the described features. Thus, the scope of the present disclosure is intended to embrace all such alternatives, modifications, and variations as fall within the scope of the claims, together with all equivalents.

All publications, patents and patent applications referenced herein are hereby incorporated by reference in their entirety for all purposes as if each such publication, patent or patent application had been individually indicated to be incorporated by reference.

The foregoing discussion has been presented for purposes of illustration and description. The foregoing is not intended to limit the disclosure to the form or forms disclosed herein. In the foregoing Summary for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, for example, as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A non-transitory computer readable medium having a computer program stored thereon for controlling an acoustic field to rotate a rotor, the computer program comprising instructions for causing one or more processors to:

transmit a signal to an acoustic transducer causing the acoustic transducer to generate an acoustic field for rotating a rotor, wherein the signal has a plurality of characteristics comprising amplitude, frequency and phase;

set an attribute of the rotor, wherein the attribute comprises a range of rotor speed; and monitor the attribute of the rotor and execute a machine-learning algorithm to dynamically control the attribute of the rotor, wherein the machine-learning algorithm uses a Markov Decision Process to:

(i) measure the attribute of the rotor using a sensor upon altering the attribute of the rotor by an amount by adjusting at least a first characteristic of the plurality of characteristics of the signal;

(ii) calculate an output of the acoustic field associated with altering the attribute of the rotor by the amount;

(iii) calculate a resulting reward based on (a) altering the attribute of the rotor by an amount and (b) a resulting output of the acoustic field associated with altering the attribute of the rotor by the amount;

(iv) calculate a maximal reward value based upon an accumulation of the resulting reward of step (iii) and additional resulting rewards that are previously calculated;

(v) continuously alter, based on a control policy and the maximal reward value, the attribute of the rotor by (a) further adjusting the first characteristic or (b) adjusting a second characteristic of the plurality of characteristics of the signal that is different from the first characteristic; and (vi) repeat steps (i) through (v) to maintain a stable rotor speed within the range.

2. The non-transitory computer readable medium of claim 1, further comprising updating the control policy based upon on whether the maximal reward value has been achieved.

3. The non-transitory computer readable medium of claim 2, wherein updating the control policy based upon on whether the maximal reward value has been achieved is performed between steps (iv) and (v) or between steps (v) and (vi).

4. The non-transitory computer readable medium of claim 1, wherein the attribute is altered by adjusting at least one of the plurality of characteristics comprising amplitude, frequency and phase.

5. The non-transitory computer readable medium of claim 1, wherein the output of the acoustic field is an amount of energy produced by the acoustic field.

6. The non-transitory computer readable medium of claim 1, wherein the acoustic field is configured to interact with a fluid in which the rotor is disposed.

7. The non-transitory computer readable medium of claim 6, wherein the output of the acoustic field is a temperature of the fluid.

8. The non-transitory computer readable medium of claim 1, wherein the computer program further comprises instructions for causing the one or more processors to calculate one or more parameters of the acoustic field upon transmitting the signal to the acoustic transducer.

9. The non-transitory computer readable medium of claim 1, wherein the machine-learning algorithm further uses the Markov Decision Process to:

confirm whether the attribute of the rotor remains within a first limit upon altering the attribute of the rotor by the amount; and confirm whether the output of the acoustic field associated with altering the attribute of the rotor by the amount remains within a second limit upon altering the attribute of the rotor by the amount.

10. A method for controlling a fluid characteristic within a medium through an acoustic field, the method comprising the steps of:

transmitting a signal to an acoustic transducer causing the acoustic transducer to generate an acoustic field to rotate a rotor, wherein the signal has a plurality of characteristics comprising amplitude, frequency and phrase phase;

calculating one or more parameters of the acoustic field upon transmitting the signal to the acoustic transducer;

setting a desired attribute of the rotor upon being subject to the acoustic field, wherein the desired attribute comprises a range of fluid speed; and monitoring the attribute of the rotor and executing a machine-learning algorithm to dynamically control the attribute of the rotor, wherein the machine-learning algorithm uses a Markov Decision Process to:

(i) measure the attribute of the rotor using a sensor upon altering the attribute of the rotor by an amount by adjusting at least a first characteristic of the plurality of characteristics of the signal;

(ii) calculate an output of the acoustic field associated with altering the attribute of the rotor by the amount;

(iii) calculate a resulting reward based on (a) altering the attribute of the rotor by an amount and (b) a resulting output of the acoustic field associated with altering the attribute of the rotor by the amount;

(iv) calculate a maximal reward value based upon an accumulation of the resulting reward of step (iii) and additional resulting rewards that are previously calculated;

(v) continuously alter, based on a control policy and the maximal reward value, the attribute of the rotor by (a) further adjusting the first characteristic or (b) adjusting a second characteristic of the plurality of characteristics of the signal that is different from the first characteristic; and (vi) repeat steps (i) through (v) to maintain a stable fluid speed within the range.

11. The method of claim 10, further comprising updating the control policy based upon on whether the maximal reward value has been achieved.

12. The method of claim 11, wherein updating the control policy based upon on whether the maximal reward value has been achieved is performed between steps (iv) and (v) or between steps (v) and (vi).

13. A system for controlling the behavior of a cell mass, the system comprising:

a medium in which the cell mass is immersed;

a rotor configured to alter a characteristic of the medium;

an acoustic transducer configured to alter the characteristic of the medium through at least the rotor;

a sensor configured to measure the characteristic; and a non-transitory computer readable medium having a computer program stored thereon, the computer program comprising instructions for causing one or more processors to:

transmit a signal to the acoustic transducer, wherein the acoustic transducer is configured to generate an acoustic field to rotate a rotor, wherein the signal has a plurality of characteristics comprising amplitude, frequency and phase;

set an attribute of the rotor upon being subject to the acoustic field, wherein the attribute comprises a range of cell mass rotation speed; and monitor the attribute of the rotor and execute a machine-learning algorithm to dynamically control the attribute of the rotor, wherein the machine-learning algorithm uses a Markov Decision Process to:

(i) measure the attribute of the rotor using a sensor upon altering the attribute of the rotor by an amount by adjusting at least a first characteristic of the plurality of characteristics of the signal;

(ii) calculate an output of the acoustic field associated with altering the attribute of the rotor by the amount;

(iii) calculate a resulting reward based on (a) altering the attribute of the rotor by an amount and (b) a resulting output of the acoustic field associated with altering the attribute of the rotor by the amount;

(iv) calculate a maximal reward value based upon an accumulation of the resulting reward of step (iii) and additional resulting rewards that are previously calculated;

(v) continuously alter, based on a control policy and the maximal reward value, the attribute of the rotor by (a) further adjusting the first characteristic or (b) adjusting a second characteristic another one of the plurality of characteristics of the signal that is different from the first characteristic; and (vi) repeat steps (i) through (v) while maintaining a stable cell mass rotation speed within the range.

14. The system of claim 13, the non-transitory computer readable medium further configured to update the control policy based upon on whether the maximal reward value has been achieved.

15. The system of claim 14, wherein updating the control policy based upon on whether the maximal reward value has been achieved is performed between steps (iv) and (v) or between steps (v) and (vi).

16. The system of claim 13, wherein the medium is a fluid.

17. The system of claim 16, wherein the characteristic is altered by altering the attribute of the rotor by the amount.

18. The system of claim 13, wherein the cell mass is supported by a scaffold structure coupled to the rotor.

19. A non-transitory computer readable medium having a computer program stored thereon for controlling an acoustic field, the computer program comprising instructions for causing one or more processors to:

transmit a signal to an acoustic transducer, wherein the acoustic transducer is configured to generate an acoustic field, wherein the signal has a plurality of characteristics comprising amplitude, frequency and phase;

set at least two attributes of the acoustic field, wherein the at least two attributes comprise corresponding ranges of acoustic output; and monitor the two or more attributes of the acoustic field and execute a machine-learning algorithm to dynamically control one of the at least two attributes of the acoustic field, wherein the machine-learning algorithm uses a Markov Decision Process to:

(i) measure the attribute of the one of the at least two attributes of the acoustic field using a sensor upon altering the one of the at least two attributes of the acoustic field by an amount;

(ii) calculate an output of the other of the at least two attributes of the acoustic field associated with altering the one of the at least two attributes of the acoustic field by the amount;

(iii) calculate a resulting reward based on (a) altering the one of the at least two attributes of the acoustic field by the amount and (b) the output of the other of the at least two attributes of the acoustic field associated with altering the one of the at least two attributes of the acoustic field by the amount;

(iv) calculate a maximal reward value based upon an accumulation of the resulting reward of step (iii) and additional resulting rewards that are previously calculated;

(v) continuously alter, based on a control policy and the maximal reward value, the one of the at least two attributes by adjusting at least one of the plurality of characteristics of the signal; and (vi) repeat steps (i) through (v) to maintain a stable acoustic output such that the two or more attributes of the acoustic field remain within the corresponding ranges.

20. The system of claim 19, further comprising updating the control policy based upon on whether the maximal reward value has been achieved.

21. The system of claim 20, wherein updating the control policy based upon on whether the maximal reward value has been achieved is performed between steps (iv) and (v) or between steps (v) and (vi).

22. The non-transitory computer readable medium of claim 19, wherein the machine-learning algorithm comprises a neural network.

23. The non-transitory computer readable medium of claim 19, wherein the machine-learning algorithm comprises fuzzy logic.

* * * * *